Oct. 27, 1964          G. L. SAWYER            3,153,862
                      EDUCATIONAL DEVICE
Filed Dec. 5, 1961                         2 Sheets-Sheet 1
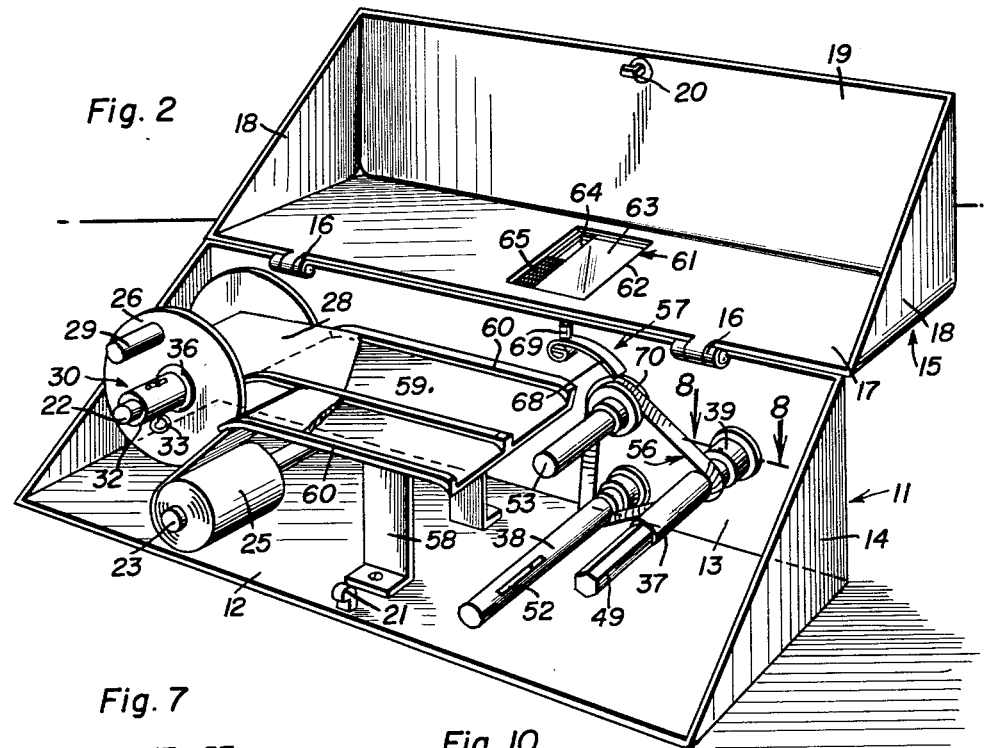
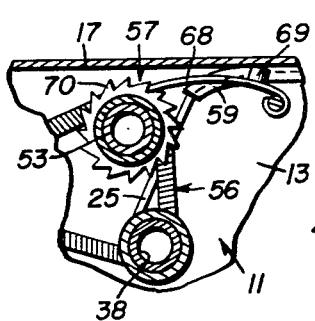
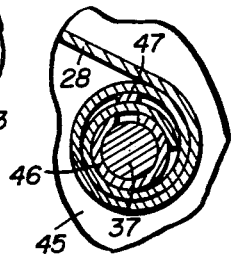
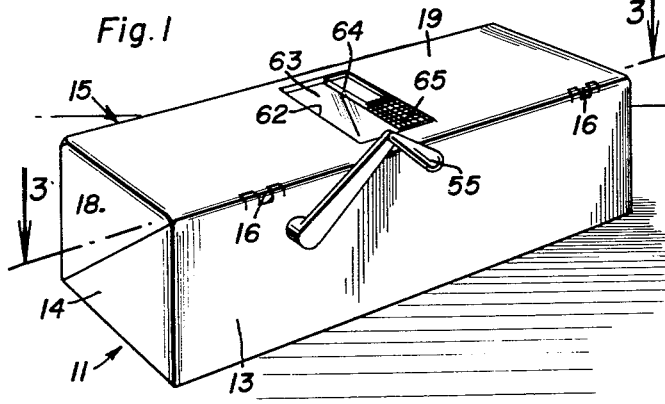
Gary L. Sawyer
  INVENTOR.

Oct. 27, 1964    G. L. SAWYER    3,153,862
EDUCATIONAL DEVICE
Filed Dec. 5, 1961    2 Sheets-Sheet 2
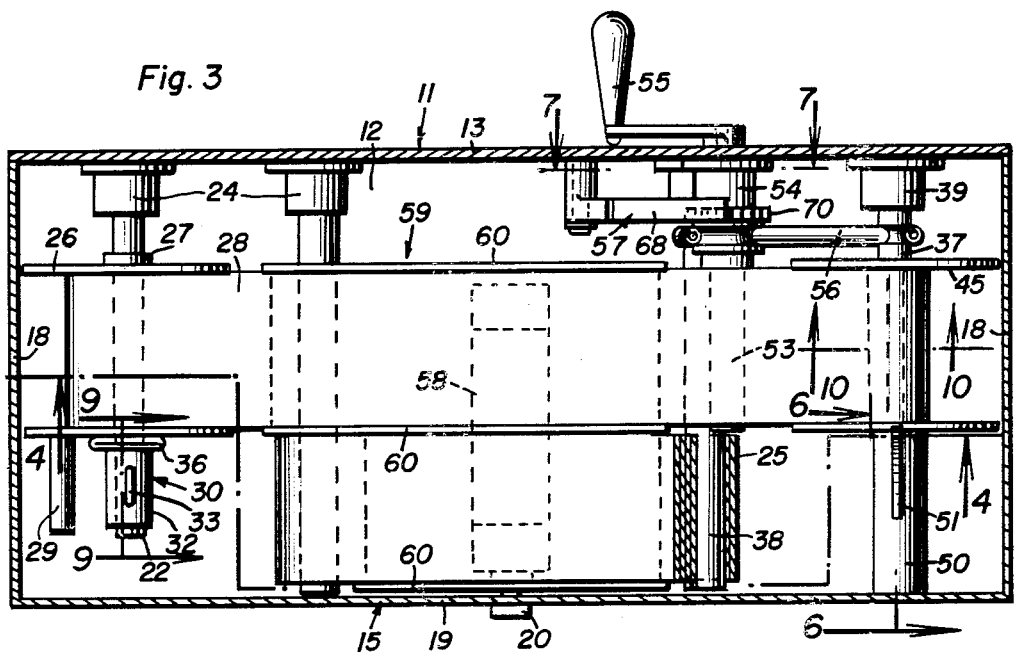
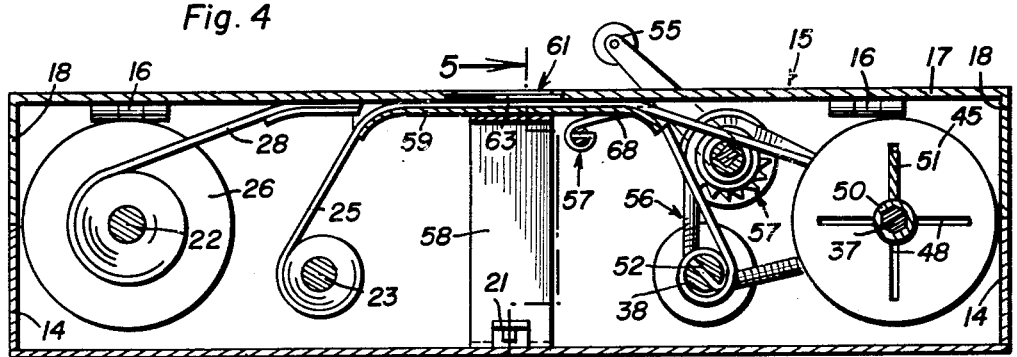
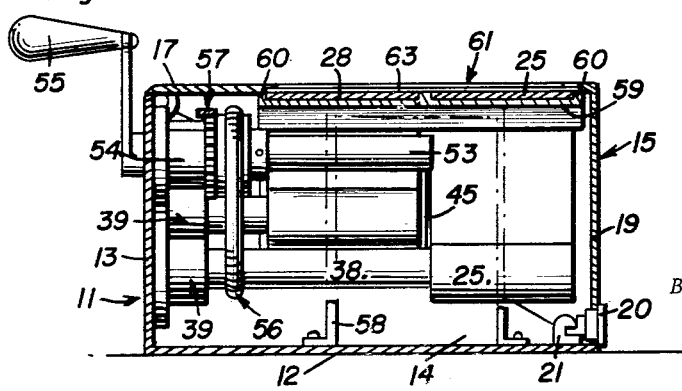
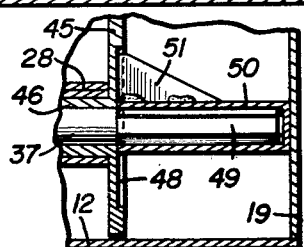
Gary L. Sawyer
INVENTOR.

United States Patent Office 3,153,862
Patented Oct. 27, 1964

3,153,862
EDUCATIONAL DEVICE
Gary L. Sawyer, 1442 W. Prince Road, Tucson, Ariz.
Filed Dec. 5, 1961, Ser. No. 157,174
4 Claims. (Cl. 35—9)

This invention generally relates to new and useful improvements in educational devices of the double reel and web or tape, question and answer type for use particularly although not necessarily in schools and has for one of its important objects to provide, in a manner as hereinafter set forth, a device of this character comprising separate question and answer tapes whereby the former may be used as often as desired while the latter may be kept as a permanent record by the teacher for future reference.

Another highly important object of the present invention is to provide an educational device of the aforementioned character wherein the students may immediately ascertain the correct answer to a question but will be prevented from altering his or her answer thereto.

Still another important object of the invention is to provide an educational device of the character described comprising novel mounting means for the tapes and for actuating said tapes in unison.

Another object of this invention is to provide an educational device of the character set forth which includes a unique cabinet or casing for housing the mechanism.

A further object of the invention is to provide a device of the character described which is both interesting and amusing as well as educational.

Other objects of the invention are to provide an educational device of the character set forth which is comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an educational device constructed in accordance with the present invention;

FIGURE 2 is perspective view of the device with the cover in open position;

FIGURE 3 is a sectional view on an enlarged scale, taken substantially on the line 3—3 of FIGURE 1;

FIGURE 4 is a view in vertical longitudinal section through the device, taken substantially on the line 4—4 of FIGURE 3;

FIGURE 5 is a cross-sectional view, taken substantially on the line 5—5 of FIGURE 4;

FIGURE 6 is a fragmentary view in cross-section on an enlarged scale, taken substantially on the line 6—6 of FIGURE 3;

FIGURE 7 is a fragmentary view in longitudinal section on an enlarged scale, taken substantially on the line 7—7 of FIGURE 3;

FIGURE 8 is a detail view in horizontal section on an enlarged scale through one of the shaft mounts, taken substantially on the line 8—8 of FIGURE 2;

FIGURE 9 is a fragmentary view in vertical section on an enlarged scale, taken substantially on the line 9—9 of FIGURE 3; and FIGURE 10 is a fragmentary view in vertical section, taken substantially on the line 10—10 of FIGURE 3.

Referring now to the drawing in detail, it will be seen that the embodiment of the invention which has been illustrated comprises a cabinet, casing or elongated box of suitable dimensions and material which is designated generally by reference numeral 11. The box 11 is substantially triangular in cross-section and includes a bottom 12, a back wall 13 and end walls 14, said box being open at its top and front. The box 11 further includes a cover 15, also triangular in cross-section which is hingedly mounted at 16 on the upper edge of the back wall 13. The cover 15 complements the correspondingly shaped box 11 and when in closed position thereon provides an enclosure or casing of substantially rectangular cross-section as shown to advantage in FIGURE 5 of the drawing. The cover 15 includes a top 17, end walls 18 and a front wall 19. Mounted on the front wall 19 is a suitable lock or latch 20 which is engageable with a keeper 21 on the bottom 12 for securing said cover in closed position.

Fixed transversely in one end portion of the box 11 is a pair of stationary spindles or the like 22 and 23. The spindles 22 and 23 are fixedly mounted in any suitable manner on the back wall 13 of the box 11 to project forwardly from said back wall, as indicated at 24. The spindle 23 is adapted to slidably and rotatably receive thereon a conventional roll of answer tape 25. Rotatably mounted on the spindle 22 is a question tape spool or reel 26. One end of the spool or reel 26 abuts a stop collar 27 (FIGURE 3) on the spindle 22. Reference numeral 28 designates a question tape on the reel 26. The front end of the reel 26 is provided with a handle 29 for rewinding the tape 28. The spindle 22 projects forwardly beyond the reel 26 and has mounted thereon a brake or drag 30 for the reel 26. The brake 30 includes a sleeve 32 which is secured against rotation on the projecting end portion of the spindle 22 by a cotter pin 33 (FIGURE 9). Aligned openings 34 and 35 in the spindle 22 in the sleeve 32, respectively, receive the cotter pin 33. A ring or the like 36 of rubber or other suitable material on the inner end of the sleeve 32 abuts the reel 26 for frictionally securing said reel against idle rotation on the spindle 22.

Rotatably mounted in the other end portion of the box 11 are tape winding shafts 37 and 38. The shafts 37 and 38 are journaled in suitable bearings 39 provided therefor on the back wall 13 of the box 11. The bearings 39 are similar and, as shown in FIGURE 8 of the drawings, in the embodiment illustrated each of said bearings includes a flanged sleeve 40 which is secured at 41 on the back wall 13 of the box 11. The shafts 37 and 38 each include an enlarged cylindrical inner end portion 42 journaled in the member 40 with a liner or the like 43 therebetween. The enlarged end portion 42 is secured in the member 40 by an inturned flange 44 on said member 40.

The shaft 37 receives on an intermediate portion thereof for rotation therewith a removable reel or spool 45 for the question tape 28. As shown to advantage in FIGURE 10 of the drawing, the hub 46 of the spool or reel 45 has struck therefrom a bar or strap 47 beneath which the end portion of the tape 28 is engaged for connecting said tape to said spool for winding thereon. The reel 45 further comprises, in at least one end or head thereof, radial grooves or slots 48. The shaft 37 comprises a polygonal outer or free end portion 49 which projects beyond the reel 45. Slidably mounted on the end portion 49 of the shaft 37 is a sleeve 50 of polygonal cross-section having a closed outer end (FIGURE 6). Fixed longitudinally on the polygonal sleeve 50 is a radial fin 51 of triangular configuration which is engageable selectively in the grooves 48 for operatively connecting the shaft 37 to the reel 45. When the cover 15 of the box 11 is in closed position the front wall 19 thereof retains the sleeve 50 in operative position, as shown. The outer or free end portion of the shaft 38 is longitudinally slotted or kerfed as at 52 to facilitate connecting one end portion of the answer tape 25 to said shaft for winding thereon.

Adjacent the shafts 37 and 38, a drive shaft 53 is journaled in a suitable bearing 54 provided therefor on the back wall 13 of the box 11. The shaft 53 extends through the back wall 13 and has fixed thereon an operating crank or handle 55. A belt and pulley drive 56 (FIGURE 2) operatively connects the shaft 53 to the driven tape shafts 37 and 38. A suitable pawl and ratchet device 57 releasably secures the drive shaft 53 against retrograde rotation.

Mounted on the bottom 12 of the box 11 at an intermediate point is a substantially inverted U-shaped bracket or stand 58. Mounted longitudinally on the bracket 58 is a viewing plate or platform 59 for the tapes 28 and 25. The viewing plate or platform 59 includes upstanding longitudinal ribs 60 providing guides between which the tapes 28 and 25 are slidable.

The top 17 of the box cover 15 is provided, above the plate or platform 59, with a viewing window 61. The window 61 includes, in the embodiment shown, a rectangular opening 62 having mounted therein a transparent plate 63. In the approach side of the viewing window 61 the transparent plate 63 is provided with a cutout or opening 64 above the tape 25 providing access thereto for writing thereon. The corresponding portion of the plate 63 which overlies the question tape 28 is blacked out or rendered opaque, as indicated at 65.

It is thought that the use or operation of the device will be readily apparent from a consideration of the foregoing. Briefly, the tape 28 not only includes the questions but also the answers thereto, said answers following said questions. To thread the machine for use the tapes 28 and 25 are trained over the viewing plate or platform 59 between the guides 60, the tapes 28 being connected to the reel 45 for winding thereon and the tape 25 being connected to the shaft 38 for winding thereon. Through the medium of the crank or handle 55 the shaft 53 is actuated for driving the shafts 37 and 38 in unison. Thus, the tapes 28 and 25 are drawn beneath the viewing window 61, said tapes traveling at the same speed. When a question on the tape 28 comes into view from beneath the portion 65 of the plate 63, the answer to that question on said tape is concealed beneath said portion 65. Noting the question, the student writes the answer thereto on the tape 25 through the opening 64. Then, to ascertain the correct answer the tapes are advanced until said answer is brought into view from beneath the opaque portion 65 of the plate 63. When this is done the student's answer has been moved forwardly beneath the plate 63 where it is inaccessible and, therefore, cannot be altered. As hereinbefore stated, the brake or drag device 30 shown in FIGURE 9 of the drawing frictionally secures the reel 26 against idle rotation. To remove the completed answer tape and to rewind the question tape, the cover 15 of the box 11 is swung to open position. By disengaging the pawl and ratchet device 57, the reel 26 may be actuated through the medium of the handle 29 for rewinding the tape 28. The wound answer tape 25 may then be slipped off the shaft 38 in an obvious manner. Opening the cover 15 also permits removal of the retainer 50 thus, the reel 45 is freed for rotation on the shaft 37 whereby the tape 28 may be rewound. Of course, removal of the member 50 also allows removal of the reel 45. Mounted on the pawl 68 of the device 57 is an upstanding lug or the like 69 which is engageable by the top 17 of the cover 15 for positively engaging said pawl with the ratchet 70 when said cover is in closed position on the box 11.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An educational device comprising a box, a question tape supply reel and an answer tape supply spindle journaled in said box, first and second tape winding shafts journaled in said box, a question tape winding reel freely rotatable on said first winding shaft, answer tape engaging means on said second winding shaft, a writing platform in said box between said supply reel and spindle and said winding shafts, question and answer tapes on said question tape supply reel and said answer tape supply spindle, respectively, and including free end portions extending over said table and secured to said windup reel and said second winding shaft, respectively, said tapes being axially spaced on said shafts and reels for winding thereon upon rotation of said winding shaft, one end portion of said first winding shaft being free and projecting axially outwardly of said winding reel and being non-circular in cross-section, a locking sleeve axially removably slidable on and rotatable with said winding shaft end portion, the end of said locking sleeve adjacent said winding reel and said winding reel including coacting means engageable with each other upon axial advancement of said sleeve towards said winding reel and for locking said winding reel and said sleeve together for simultaneous and equal rotation, said box including at least one open side through which access to said winding shafts may be gained and through which said winding reel and the answer tape on said second winding shaft may be removed, a cover for said open side of said box removably secured in a closed position closing said one side, said cover including means defining an abutment engageable with the outer free end of said sleeve to prevent its axial withdrawal from engagement with said first winding shaft and disengagement of said coacting locking means, and means connecting said shafts for simultaneous rotation.

2. The combination of claim 1 wherein said last mentioned means includes releasable means for preventing rotation of said winding reel in a direction to unwind the question tape wound thereon.

3. The combination of claim 2 wherein said question tape reel includes a crank handle for rewinding the answer tape thereon when said last mentioned means is released.

4. The combination of claim 1 wherein said means connecting said shafts comprises a drive shaft journaled in said box, aligned wheels mounted on said shafts, an elongated endless flexible drive member entrained about said wheels and drivingly connecting said drive shaft to said first and second tape winding shafts, said drive shaft including one end portion projecting outwardly of said box and having a crank handle mounted on its extended end portion.

(References on following page)

References Cited in the file of this patent

UNITED STATES PATENTS

| | | |
|---|---|---|
| 1,180,966 | Barthold | Apr. 25, 1916 |
| 1,641,982 | McDade | Sept. 13, 1927 |
| 1,905,381 | Griffin | Apr. 25, 1933 |
| 2,087,043 | Phillips | July 13, 1937 |
| 2,169,266 | Matter | Aug. 15, 1939 |
| 2,702,165 | Wildman | Feb. 15, 1955 |
| 2,740,206 | Schatz | Apr. 3, 1956 |
| 2,987,828 | Skinner | June 13, 1961 |
| 3,056,215 | Skinner | Oct. 2, 1962 |
| 3,096,101 | Raddeman | July 2, 1963 |
| 3,105,307 | Cornell | Oct. 1, 1963 |
| 3,106,026 | Jackson et al. | Oct. 8, 1963 |

OTHER REFERENCES

"An Automated Teaching System, a Teaching Machine, and Programmed Learning," published by the Institute for Instructional Improvement, Inc., Sept. 1, 1961.